July 25, 1950 E. G. BOICE 2,516,748
TORQUE INDUCTION MECHANISM
Filed July 11, 1944 5 Sheets-Sheet 3

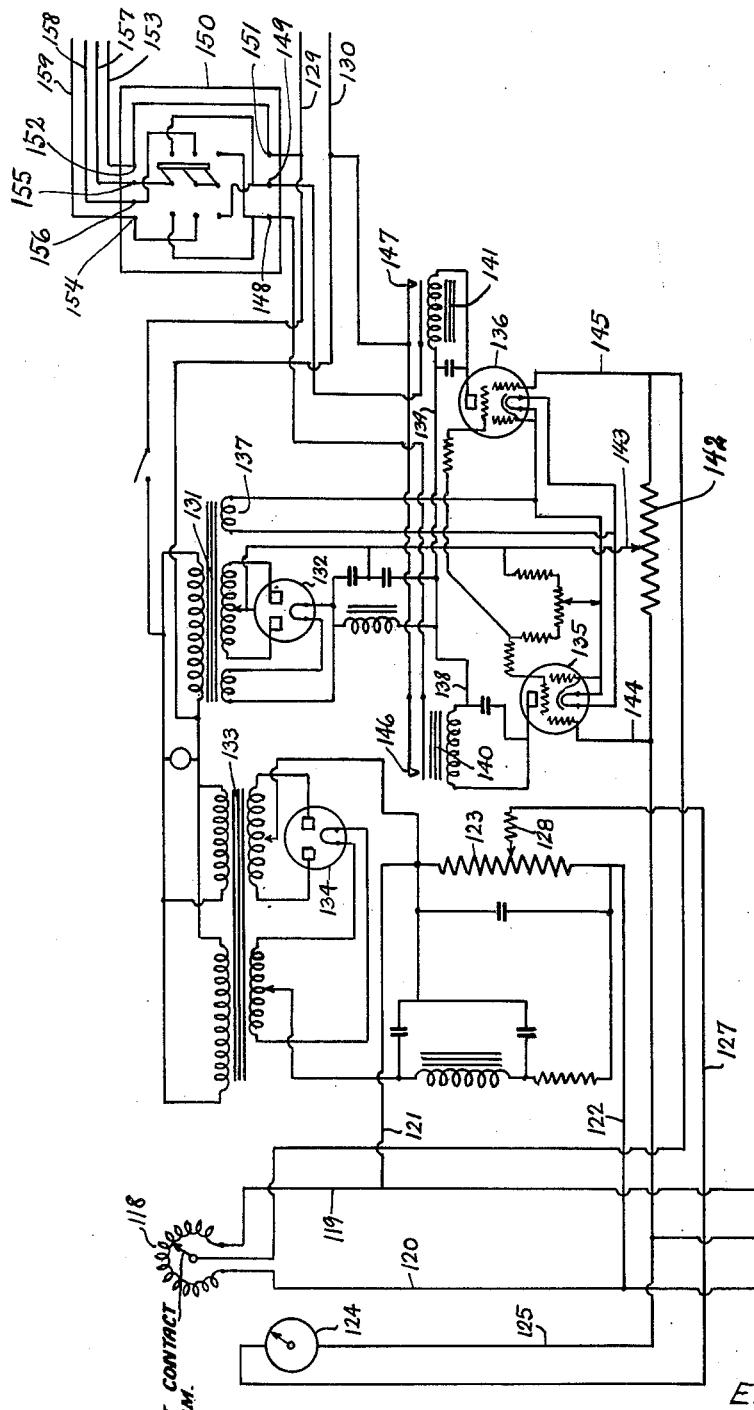

INVENTOR.
ELVIN G. BOICE.
BY
ATTORNEYS

July 25, 1950

E. G. BOICE 2,516,748

TORQUE INDUCTION MECHANISM

Filed July 11, 1944

INVENTOR.
ELVIN G. BOICE.
BY
ATTORNEY

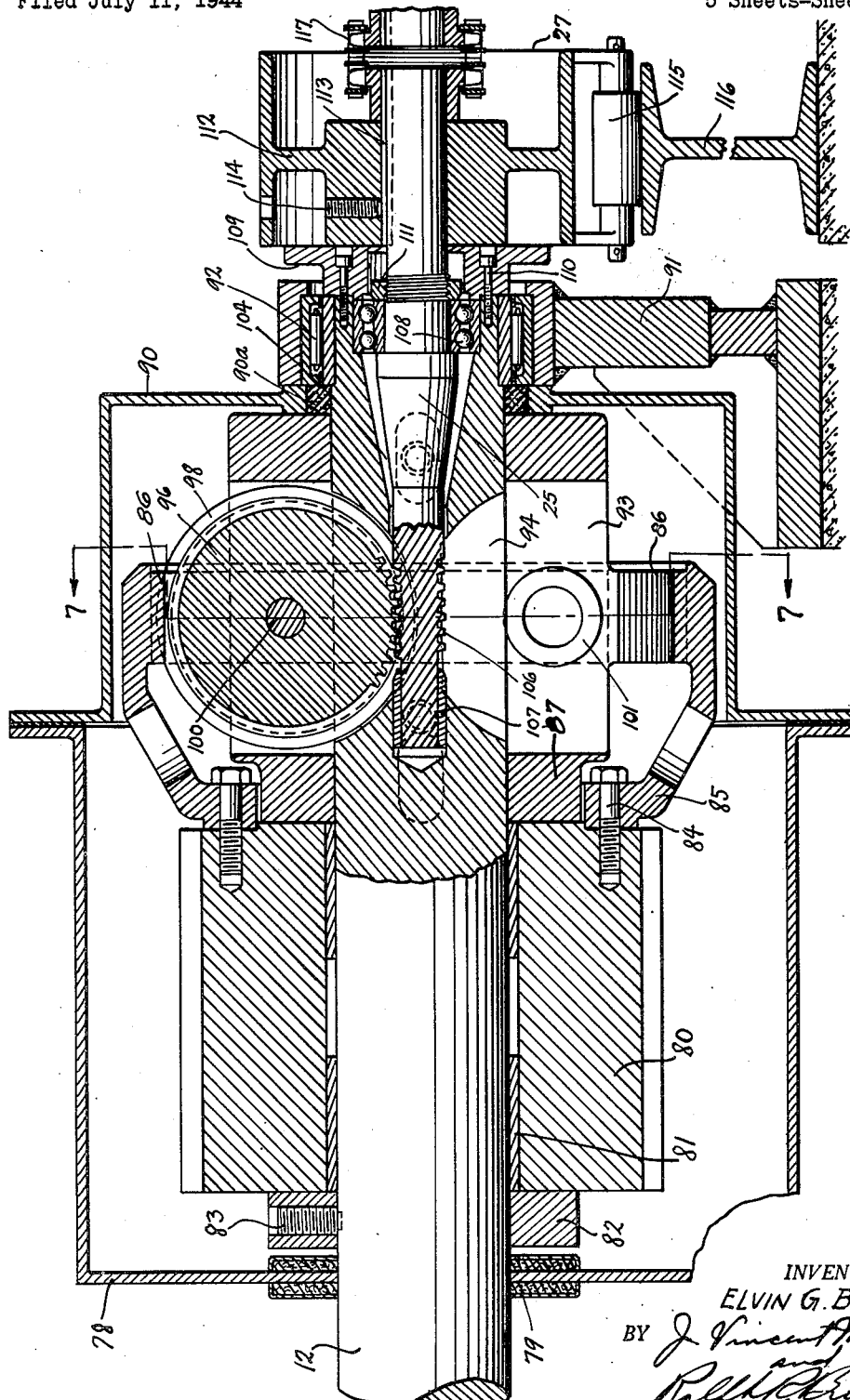

Patented July 25, 1950

2,516,748

UNITED STATES PATENT OFFICE 2,516,748

TORQUE INDUCTION MECHANISM

Elvin G. Boice, Houston, Tex., assignor to Reed Roller Bit Company, Houston, Tex., a corporation of Texas Application July 11, 1944, Serial No. 544,449

10 Claims. (Cl. 73—162)

This invention relates in general to testing apparatus and has for its general object the provision of a device for testing under load a gear mechanism or other means adapted for the transmission of mechanical energy.

It is the usual practice in testing gear mechanisms or the like which are employed for the transmission of mechanical energy to drive such mechanism by means of a prime mover of a capacity sufficient not only to rotate the mechanism at the desired speed, but also to transmit to and through the mechanism an amount of power comparable to that which the mechanism is intended to transmit in actual use; and to connect to the output of the mechanism some sort of power or energy absorption device such as a Prony brake or electrical generator with suitable resistances or other means for absorbing the output thereof. Such an arrangement is not highly objectionable in the case of the testing of relatively small units but where it is necessary to test units intended for the transmission of very large amounts of power such as for example the transmission and final drive for a tank or large tractor or the like, it becomes a very highly expensive proposition because of the necessity for providing a prime mover of a size sufficient to not only rotate the mechanism but to transmit through the mechanism the amount of power which it is intended to transmit in practice. The cost of the power thus used also becomes very great, as does the cost of suitable apparatus for absorbing the very great amount of energy thus employed in testing the equipment.

It is an object of this invention to provide a testing apparatus for such mechanical power transmitting devices, which apparatus will be capable of testing such devices under any required load without the use of excessive power for operating the testing apparatus and without the necessity for the absorption of energy comparable to the load under which the device is being tested.

Another object of this invention is to provide a means of the type referred to which will include a mechanism for indicating throughout the duration of the test the torque or stress under which the device under test is being tested.

Another object of this invention is to provide a means for automatically maintaining such torque or stress at a desired value throughout the test.

Another object is to provide a means for increasing or decreasing the torque or stress during the progress of the test.

Another object is to provide a means for changing the phase relationship between the parts of the testing device during the operation thereof.

Another object is to provide a means for controlling and changing the phase relationship of two rotating elements while they are rotating.

Other objects and advantages of this invention will become apparent from the following description taken in connection with the accompanying drawings wherein is set forth by way of illustration and example certain embodiments of the invention.

In the drawing:

Fig. 1a shows in electrical diagram form the remainder of the various electrical controls and connections.

Fig. 2 shows an electrical diagram similar to a portion of Fig. 1a but illustrating a slight modification in the electrical apparatus illustrated in Fig. 1a.

Fig. 6 is a longitudinal cross section through the torque induction mechanism forming a part of the testing apparatus and used for the purpose of controlling and changing the amount of torque to which the device under test is being subjected and hence the amount of load under which the test is being made.

Figure 1:
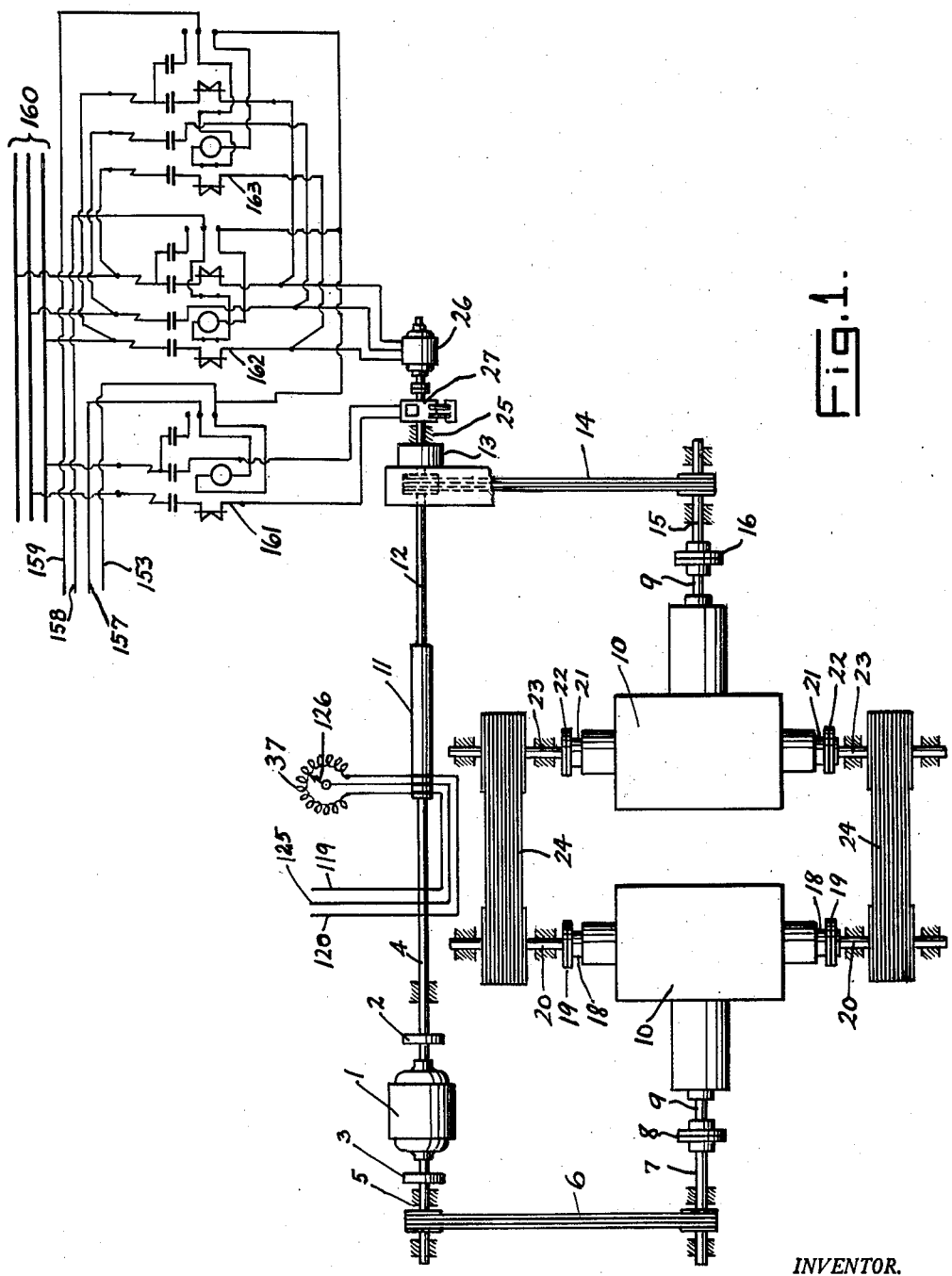
Fig. 1 is a diagrammatical view showing in plan the general layout of an apparatus constructed in accordance with this invention and showing in electrical diagram form a portion of the various electrical controls used in connection with such apparatus together with their electrical connections to each other and to the apparatus itself.

Referring back to Fig. 1, there is indicated at 1 a motor or other means for rotating the testing apparatus and the device or devices to be tested thereby. This motor with the apparatus which will presently be described need have only sufficient load capacity to overcome the friction within the testing apparatus and within the devices to be tested and need not have sufficient power capacity or load capacity to actually transmit through the devices being tested the load or loads for which they were designed.

The motor 1 is connected by means of suitable clutches 2 and 3 with shafts 4 and 5 which extend therefrom in opposite directions. The shaft 5 is connected by means of a suitable chain or other positive drive 6 to a third shaft 7 having a coupling means 8 thereon by which the shaft 7 is adapted to be coupled to the input shaft 9 of a transmission mechanism 10 or the like which is to be tested.

The shaft 4 has connected to its end opposite the motor 1 a torque responsive device generally indicated at 11 which will be described more in detail hereinafter, and to the opposite end of this torque responsive mechanism there is connected still another shaft 12 connected through the torque induction mechanism 13 to a sprocket which drives chain 14 by which a shaft 15 similar to the shaft 7 and opposed thereto may be driven. This shaft 15 is provided with coupling means 16 by which it might be connected to the input shaft 9 of a second transmission mechanism 10 or the like.

The outputs from the two transmission mechanisms 10 may be connected to each other in the manner illustrated, the output shafts 18 of one such mechanism being connected by means of couplings 19 to shafts 20, and the output shafts 21 of the other mechanism being connected by means of couplings 22 to shafts 23. The shafts 20 and 23 are connected to each other in any positive manner such as by means of chain drives 24.

The torque induction mechanism 13 is adapted to be operated by means of a shaft 25 which due to residual friction in the torque induction mechanism, hereinafter described, normally rotates with the shaft 12 and the torque induction mechanism and at the same speed as the shaft 12 and torque induction mechanism, but which may be speeded up to run faster than the shaft 12 by means of a suitable motor 26, or slowed down to run slower than the shaft 12 by means of a suitable brake 27. Such motor and brake are controlled in the manner hereinafter to be set forth.

Figure 3:
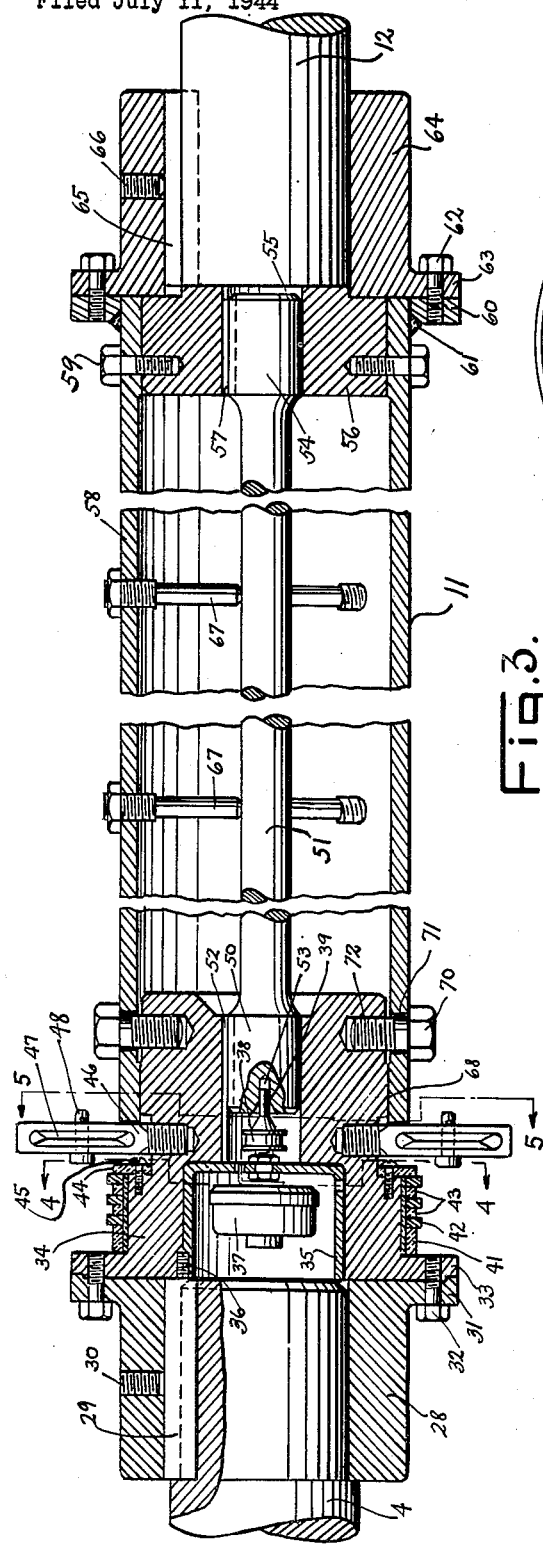
Fig. 3 is a view in longitudinal cross section through the torque responsive and torque indicating means forming a part of the testing apparatus.
Figure 4:
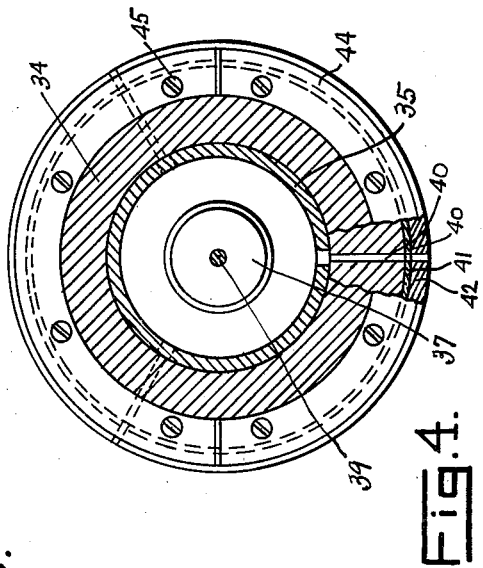
Fig. 4 is a transverse cross section through the apparatus illustrated in Fig. 3 and taken along the line 4—4 of Fig. 3.
Figure 5:
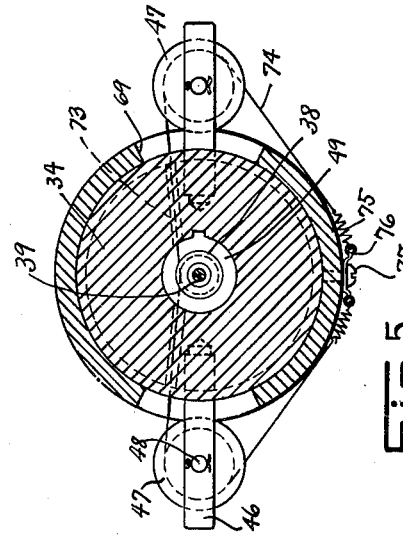
Fig. 5 is a view similar to Fig. 4 but taken along the line 5—5 of Fig. 3.

Referring now more in detail to Figs. 3, 4 and 5 wherein the torque responsive and indicating apparatus is illustrated, it will be seen that there is mounted on the end of the shaft 4 a suitable coupling member 28 keyed to the shaft 4 by means of a key 29 and secured in place on such shaft by means of a suitable set screw 30. This coupling member is provided with a flange 31 adapted to be connected by means of cap screws 32 or the like to the flange 33 of a body or block 34 having a recess therein extending from its end adjacent the shaft 4 to a point intermediate the ends of the block 34. This recess is preferably provided with a cup-shaped lining 35 preferably formed of an insulating material and secured in place by means of a suitable screw 36. Disposed within this recess and within and fixed to the liner 35 is a potentiometer 37 having a suitable resistance and adapted to be actuated to vary such resistance by means of a pulley 38 mounted on a shaft 39 which extends into the potentiometer. This potentiometer is preferably of the type having taps from its opposite ends with a movable brush adapted to move over the potentiometer from one end to the other thereof and make contact therewith at any desired intermediate point. The leads from this potentiometer may be brought out through suitable openings 40 extending radially through the liner 35 and block 34 and through the insulating sleeve 41 which surrounds the exterior surface of the block 34. Three such passageways 40 are provided one for each of the leads from the two ends of the potentiometer 37 and from the movable contact thereof.

Surrounding the insulating sleeve 41 are three slip rings 42 separated from each other by means of suitable insulating rings 43, the entire assembly being secured in place upon the block 34 by means of a segmental ring 44 formed in two parts and secured in place by means of screws 45 or the like. Each of the openings 40 from the interior of the block 34 preferably registers with the inside surface of one of the slip rings 42 and communicates with an opening through such slip ring so that the leads from the potentiometer 37 may be passed into such opening and soldered or otherwise secured in place therein thereby making contact with the slip ring 42.

Beyond that portion carrying the slip rings 42 the block 34 is provided with a portion of reduced diameter and this portion has threaded openings in its opposed sides adapted to receive brackets 46 each of which brackets carries a pulley or sheave 47 mounted upon a suitable shaft 48, each of such pulleys being in a plane substantially at right angles to the axis of the block 34.

Beyond the recess in which the potentiometer 37 is mounted the block 34 is provided with a bore 49 in which the pulley 38 is located, and which bore is adapted to receive the end 50 of a shaft section 51 which is adapted to be distorted by torque so that the two ends 50 and 54 of the shaft section may have their phase relationship changed when torque is placed upon the shaft section.

The end 50 of this shaft section 51 is secured against rotation within the block 34 by means of a shrink fit in bore 49 and further secured by a key 52 and the end of this shaft section is also provided with a central bore 53 adapted to receive the end of the shaft 39 which extends from the potentiometer 37 so as to form a bearing for such shaft.

The opposite end of the shaft 51 is provided with an end portion 54 mounted with a shrink fit in a bore 55 within an auxiliary block 56, and is keyed within such bore by means of a suitable key 57. Secured to this block 56 is a sleeve 58, the cap screws 59 or the like extending through the end portion of this sleeve and tightly securing it to the block 56. The end of this sleeve which surrounds the block 56 is also provided with a flange portion 60 which may be welded thereto as shown at 61 and which is adapted to be secured by means of cap screws 62 or the like to the flange 63 of a coupling member 64. This coupling member 64 is keyed at 65 to the shaft 12 of the apparatus and is held in place on the end of that shaft by means of a suitable set screw 66.

The sleeve 58 is substantially larger in diameter than the shaft 51 and completely encloses the space between the blocks 34 and 56. As indicated, this sleeve is tightly secured both to the block 56 and to the coupling member 64 which is rigidly mounted on the shaft 12 so that the sleeve is forced to rotate with the shaft 12 and cannot have its phase relationship to the shaft 12 changed.

Intermediate its ends, the sleeve 58 is provided at selected planes normal to the sleeve axis with suitable pins 67. Preferably three pins are provided at each plane and are disposed at 120° with respect to each other, the pins are adjustably carried by the sleeve and extend inwardly so that their inner ends clear the intermediate portions of the shaft 51 by approximately 0.010 inch for the purpose of reducing radial distortion and vibration therein.

The end of the sleeve 58 adjacent the block 34 is provided with a bearing surface internally thereof which is adapted to engage a similar bearing surface on the exterior of the block 34 adjacent the brackets 46 in the manner indicated at 68. This sleeve is provided with cutaway portions 69 adapted to permit its end portion to project beyond the brackets 46 but to leave ample space on each side of these brackets 46 so that the sleeve 58 will be free to rotate for a limited distance with respect to the block 34. The sleeve extends over the end portion of the block 34 so that the block and sleeve are normally relatively rotatable. Cap screws 70 or the like, which pass through circumferentially extending slotted openings 71 in the sleeve 58 and are threaded at 72 into the block 34 are normally loose to permit such rotation, but may be tightened to lock the sleeve 58 to the block 34 when it is desired not to use the torque indicator.

In the same plane with the pulleys 47 there are provided passageways 73 extending from the bore 49 to the exterior of the block 34 and so disposed as to be tangent to the pulley 38 of the potentiometer 37 and to one of the pulleys 47 carried by the brackets 46. For the purpose of operating the potentiometer 37, a cord or wire 74 is passed around the pulley 38, one or more turns and its opposite ends extended out through the passageways 73 and over the respective pulleys 47. To each of these opposite ends is connected a suitable spring 75 so as to maintain the cord or wire 74 in tension at all times, and the ends of such springs are anchored to a bracket 76 held rigidly on the sleeve 58 by means of a screw 77.

It will be seen that when one of the shafts 4 or 12 is turned with respect to the other there will be induced in the flexible shaft section 51 a torque which will twist this shaft section thus changing the phase relationship between the two ends thereof. Inasmuch as the sleeve 58 is rigidly secured to the end 54 of this shaft section 51, and the block 34 is rigidly secured to the opposite end 50 thereof, the phase relationship between the sleeve 58 and the block 34 will be changed. When such a change takes place it will result in a pull on one end or the other of the cable or wire 74 thereby effecting rotation of the pulley 38 and causing movement of the movable contact of the potentiometer 37. It will thus become apparent that the position of the movable contact of the potentiometer 37 will indicate the phase relationship existing between the shaft sections 4 and 12 and hence the distortion of the shaft section 51 produced by the torque induced in the system.

Figure 7:
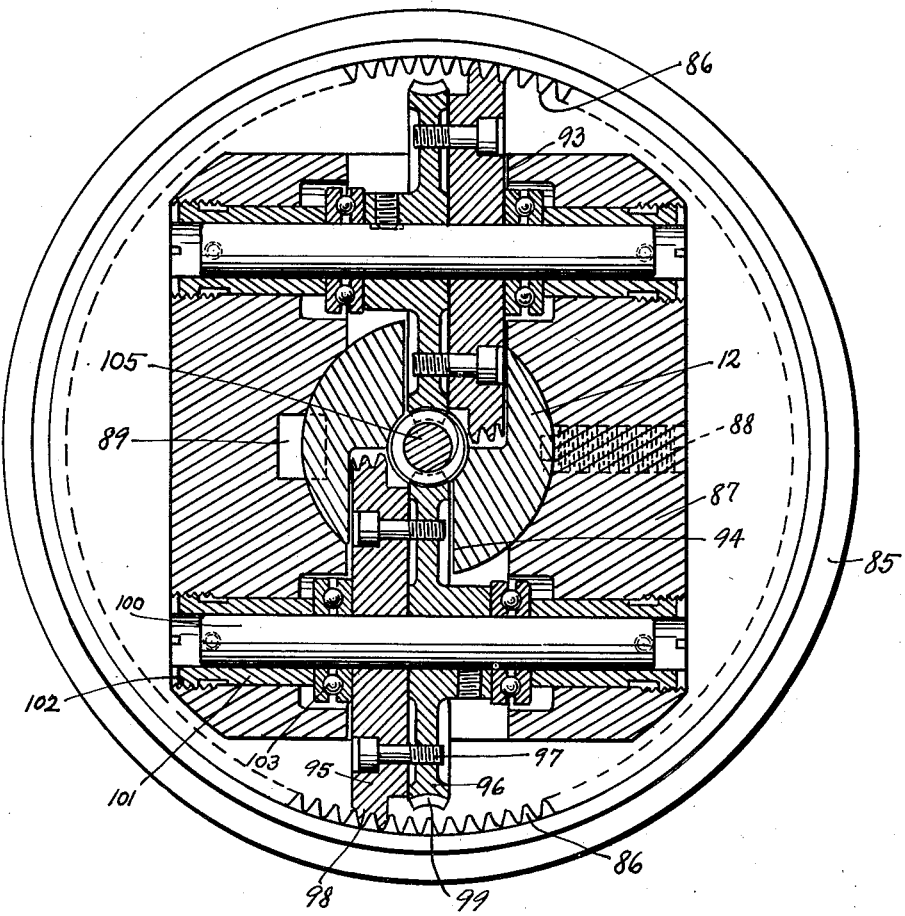
Fig. 7 is a transverse cross section through the apparatus illustrated in Fig. 6 and taken along the line 7—7 of Fig. 6.

Referring now to the torque induction mechanism as illustrated in Figs. 6 and 7, it will be seen that adjacent the end of the shaft 12 it is provided with a housing section 78 having a suitable dust seal 79 surrounding the shaft. Within this housing section there is rotatably mounted a sprocket wheel 80 adapted to cooperate with the chain drive 14 illustrated in Fig. 1, the housing 78 being so arranged as to substantially enclose said chain drive. The sprocket wheel 80 is rotatably mounted upon the bushing 81 which is carried by the shaft 12, and is held in position against endwise movement in one direction by means of a collar 82 secured in place by a set screw 83.

At its end opposite the collar 82 the sprocket 80 is drilled and tapped to receive cap screws 84 by which a cage 85 is secured rigidly to the end of the sprocket wheel. This cage 85 projects toward the end of the shaft 12 and has an annular section provided with internal teeth 86 adapted to be driven by a threaded worm wheel drive.

Nonrotatably mounted on the shaft 12 between the end thereof and the sprocket 80 is a gear block or support 87 secured on the shaft by means of a set screw 88 and held against rotation thereon by means of a suitable key disposed in the keyway 89. Enclosing this gear support 87 is a second housing section 90 secured at one end to the first housing section 78 and having its opposite end provided with an inwardly extending radial wall having a dustproof joint engaging the outer surface of the shaft 12 at the end of the gear supporting block 87. The dustproof joint is indicated by the numeral 90a.

Adjacent the dustproof joint 90a is a bearing support 91 in which is mounted a bearing 92 for the end portion of the shaft 12.

The gear supporting block 87 is on opposite sides thereof provided with openings 93 from its exterior surface inwardly to the shaft 12, and the shaft 12 is slotted as shown at 94 in registration with the openings 93 in the gear supporting block, so that threaded worm drive wheels 95 and toothed worm driven wheels 96 may be disposed in these slots. The wheels 95 and 96 are rigidly secured together by any suitable means such as the screws 97.

The two worm drive wheels 95 have threads or spiral teeth 98 thereon adapted to mesh with and to drive the gear formed by the teeth 86 within the cage 85. Thus, when each of the wheels 95 is rotated upon its axis it will produce rotation of the cage 85 with respect to the block 87 and will thereby change the phase relationship of the sprocket 80 with respect to the shaft 12.

Each of the two driving gear wheels 96 is provided on its outer edge with worm teeth 99 adapted to be driven by a worm screw. Both pairs of these gear wheels 95 and 96 are mounted for rotation upon shafts 100 the ends of which are carried by bushings 101 adjustably mounted by means of threads 102 within bores in the block 87 which bores extend transversely of the openings 93 and slots 94. In order to take the end thrusts from the driving worm wheels 95 the thrust bearings 103 are provided between these wheels and the bushings 101.

The end of the shaft 12 is provided with a bore 104 adapted to receive the end of the shaft 25, and this shaft in turn extends between and has teeth or a worm screw 106 formed thereon for the purpose of meshing with the teeth 99 on the wheels 96 so that when the shaft 25 is rotated with respect to the shaft 12 and the block 87, the wheels 95 and 96 will be caused to rotate upon their own axes and this in turn will cause rotation of the cage 85 with respect to the shaft 12. The shaft 25 is provided with a bearing adjacent its inner end within the shaft 12 as shown at 107, and with a second bearing substantially at the end of the shaft 12 as shown at 108. This second bearing 108 is held in position within the shaft 12 by means of a cap 109 secured to the end of shaft 12 by means of screws 110. Where shaft 25 protrudes through cap 109 a grease seal or the like is provided and retained in a bored section of cap 109 for the purpose of preventing leakage of lubricant adjacent to cap 109.

The shaft 25 and the worm screw teeth thereon is held in proper position with respect to the teeth 99 on the wheels 96 by means of the bearing 108 which is secured to the shaft 25 by means of nut 111.

Mounted on the outer end of the shaft 25 is a brake drum 112 which is held against rotation with respect to the shaft 25 by means of a suitable key 113. The inner face of brake drum 112 is held in frictional contact with the outer face of cap 109 by means of set screw 114 forming a friction drive connection between shaft 12 and shaft 25. Suitable brake shoe mechanism 115 is mounted on a support 116 for engagement with the brake drum 112.

The outer end of the shaft 25 is provided with a coupling 117 by which it may be coupled to the shaft of the motor 26. Thus it will be seen that if the mechanism is operating, as long as the brake drum 112 is free and no power is applied to the motor 26, the shaft 25 by reason of residual friction within the mechanism and friction between the clutch action between brake drum 112 and cap 109 will rotate with the shaft 12 as will also the cage 85 and there will be a fixed phase relationship between the sprocket 80 and the shaft 12. However, if it be desired to change this phase relationship for the purpose of imposing a greater torque or for the purpose of decreasing the torque between the shaft 12 and the shaft 4, and hence the torque load which is placed upon the mechanisms 10 undergoing tests, the brake 27 may be actuated thereby overcoming the residual friction in the mechanism and clutch so as to retard the rotation of the shaft 25 with respect to the shaft 12. This will cause a relative rotation between the shaft 25 and the block 87 thereby causing rotation of the gear wheels 95 and 96 upon their axes and producing a change in the phase relationship between the sprocket 80 and the shaft 12. If it be desired to change this phase relationship in the opposite direction so as to make the opposite change in the torque load, then the motor 26 may be actuated to drive the shaft 25 faster than the shaft 12 is rotating. This again will produce relative rotation between the shaft 25 and the gear carrying block 87 thereby producing an opposite rotation of the gear wheels 95 and 96 and an opposite change in the phase relationship between the sprocket 80 and the shaft 12.

Referring to Figs. 1 and 1a and particularly to the electrical diagram portions thereof, it will be noted that there is connected in parallel with the potentiometer 37 a second and exactly similar potentiometer 118, and that a suitable direct current supply voltage is impressed across the opposite or stationary contacts of these two potentiometers which are connected by means of conductors 119 and 120. This direct current supply may be connected to the conductors 119 and 120 by means of conductors 121 and 122.

A resistance 123 of sufficiently high order to prevent the flow of a substantial amount of current is shunted across the direct current supply lines 121 and 122. A torque indicator in the form of a direct current meter 124 calibrated in terms of torque may be connected by means of a conductor 125 to the movable contact 126 of the potentiometer 37 and by means of a conductor 127 to a sliding contact on the resistance 123 through a suitable auxiliary resistance 128. It will be seen that depending upon the setting of the movable contact on the resistance 123, there will be a point on the potentiometer 37 at which the movable contact 126 thereof will be at the same potential as the movable contact on the resistance 123 and at this point there will, of course, be no voltage across the meter 124 and hence there will be a zero reading on this meter. This position should correspond to a position of no torque on the shaft section 51. However, when the torque is induced in the shaft section 51 by virtue of the operation of the gear mechanism illustrated in Figs. 6 and 7, the movable pointer 126 will be moved in one direction or the other with respect to the resistance in the potentiometer 37 thus changing its potential in one direction or another with respect to the potential of the movable contact on the resistance 123, and this will cause a movement of the indicator on the meter 124 which in direction and proportion will indicate the direction and amount of torque induced in the flexible shaft 51.

It will be appreciated that the brake 27 and motor 26 might be manually actuated in accordance with fluctuations in the meter 124 so as to maintain a substantially constant torque within the shaft section 51, or if desired a relay mechanism might be connected directly to the meter 124 or in the lines supplying that meter for the purpose of controlling the brake 27 and the motor 26.

However, in order to provide for the direct current supply necessary to actuate the meter 124 and the other associated elements certain additional equipment is necessary as will now be described, and in connection therewith it has been found preferable to include certain amplifying means so as to provide a control for the brake 27 and motor 26 which will be more sensitive to fluctuations in the torque in the shaft section 51.

The amplifier relay assembly just referred to is adapted to receive its power supply from a suitable 110 volt or other similar alternating current line represented by the conductors 129 and 130. Connected across these conductors is a transformer 131 which supplies both plate and filament supply for a full-wave rectifier tube 132, and a second transformer 133 which similarly supplies current for the plate and filament of a second full-wave rectifier tube 134. The tube 134 is arranged to supply the direct current voltage which is impressed across the conductors 121 and 122 hereinbefore referred to.

The transformer 131 is also provided with a secondary coil 137 which furnishes the filament supply for amplifier tubes 135 and 136. The tube 132 provides plate voltage for the amplifiers 135 and 136, this tube being connected through conductors 138 and 139 to relays 140 and 141 which are in series with the plate circuits of the tubes 135 and 136.

Connected between the movable contacts of the potentiometers 37 and 118 is a relatively high resistance 142 having a center tap 143 connected through suitable resistances to the screen grids of the tubes 135 and 136 and to the filaments thereof. The opposite ends of the resistance 142 are connected by means of a conductor 144 to the grid of the tube 135 and by the conductor 145 to the grid of the tube 136.

It is intended that the potentiometer 118 should be set at such a point as will be comparable to the desired torque which it is desired shall be induced in the shaft section 51. When the movable contact 126 on the potentiometer 37 is at the same point, the two will have the same potential and there will be no tendency for current to flow through the resistance 142. However, if the torque on the shaft 51 is different from that desired so that the movable contact 126 does not occupy the same relative position as the movable contact on the potentiometer 118, then there will be a tendency for current to flow in one direction or the other through the resistance 142.

It will further be seen that if the torque represented by the setting of the movable contact 126 is too low, current will flow through the resistance 142 in one direction, thereby causing a voltage drop between the movable contact 143 and the grid of one of the amplifier tubes 135 or 136. This will cause the grid of such amplifier tube to become biased to such a degree as to initiate a flow of current in the plate circuit of that tube and cause the closing of the relay 146 or 147 as the case may be. If on the other hand the torque represented by the setting of the movable contact 126 is too high, there will be flow through the resistance 142 in the other direction and the other of the two amplifier tubes will be caused to produce a flow of current in its plate circuit thereby closing the other of the relays 146 or 147. The closing of the one or the other of these relays will serve to bring the torque on the shaft section 51 back to the desired value through the operation of the relays 146 and 147 as follows:

Referring again to the 110 volt A. C. supply through the conductors 129 and 130, it will be seen that the conductor 130 is connected to the relays 146 and 147 and that the relay 146 is connected to the binding post 148 and the relay 147 is connected to the binding post 149 of the forward and reverse controller switch 150. The conductor 129 is connected to the binding post 151 of this switch but does not pass through the switch proper, being connected directly to the opposite binding post 152 from which a common wire 153 leads to the brake and motor control relays presently to be described.

The binding posts 148 and 149 are connected to a three pole double throw switch which is adapted to be positioned in one position for one direction of rotation of the testing apparatus and in the opposite position for the other direction of rotation thereof. It will be seen that when the switch is thrown to its left-hand position as seen in Fig. 1 the binding post 149 will be connected through the two lower blades of the switch to the binding post 154, and that when in the same position the binding post 148 will be connected through the uppermost blade of the switch to the binding post 155.

Likewise, when the switch is in its right-hand position as seen in Fig. 1 the binding post 149 will be connected through the uppermost leg of the switch to the binding post 155 while the binding post 148 will be connected through the two lowermost legs of the switch to the binding post 156. Conductors 157, 158 and 159 lead respectively from the binding posts 155, 156 and 154 so that it will be seen that when the relay 146 is closed and the switch 150 is in its left-hand position, the conductor 157 which leads to the brake will be energized, and with the switch in the same position and the relay 147 closed, the conductor 159 which leads to the relay controlling the rotation of the motor in one direction will be energized. On the other hand, with the switch in the right-hand position and the relay 146 closed, the conductor 158 which leads to the relay controlling the operation of the motor in the opposite direction will be closed, and with the relay 147 closed and the switch in the same position, the conductor 157 leading to the relay controlling the operation of the brake will be closed. The switch 150 will of course be placed in its right-hand or its left-hand position depending upon the direction in which the testing apparatus is being operated at the time.

As above stated, the conductor 153 is common to all of the relays connected with the brake and with both directions of operation of the motor 26. Both the brake and the motor are adapted to be energized from a suitable electric supply line 160 which is here shown as a three phase supply line. With the conductor 157 energized in either of the ways above set forth, the relay 161 leading to the brake 27 will be closed and the brake energized to cause the slowing up of the shaft 25 with respect to the speed of operation of the shaft 12, thus causing a change in the phase relationship between the sprocket 80 and the shaft 12. When this change in phase relationship has effected the desired change in the amount of torque in the shaft 51, the potentiometer 37 will have reached the setting which corresponds to the setting of the potentiometer 118, whereupon both relays will open and the brake will be de-energized. Upon closing of either the relay 162 or the relay 163, which are identical except that they reverse the leads to the motor 26 so that the closing of one relay will operate this motor in one direction and the closing of the other will operate it in the other direction, the motor will operate to cause the shaft 25 to rotate relatively faster than the shaft 12 thereby operating the torque induction mechanism to change the amount of torque represented by the twisting of the shaft section 51 until the setting of the potentiometer 37 corresponds to the setting of the potentiometer 118 whereupon both relays 146 and 147 will be open and will remain so until for any reason the torque within the system becomes different from that desired.

It is thought that from the foregoing the operation of the entire testing apparatus will be clear but it may be explained in a general manner that either one or two transmissions such as those indicated by the numeral 10 may be tested, two such transmissions being shown as being tested in the present instance for the purpose of convenience. It will also be apparent that this testing apparatus is not limited to the transmissions of the type referred to but may be used for testing any type of transmission in which mechanical energy is transmitted from one end to the other thereof. With the transmission connected at both ends to the testing apparatus, the potentiometer 118 will be set for a torque corresponding to the torque which the transmission is intended to transmit in actual practice or corresponding to the torque at which it is desired to test the transmission. Through the action of the relays 146 and 147 and of the relays 161, 162 and 163, either the brake 27 or the motor 26 will be actuated to change the phase relationship between the sprocket 80 and the shaft 12 until sufficient torque has been built up in the shaft section 51 to bring the setting of the potentiometer 37 to a position corresponding to that of the potentiometer 118. Thereupon all of the relays will open and the shaft 25 will rotate as a unit with the shaft 12 and the sprocket 80, the gear mechanism illustrated in Figs. 6 and 7 being non-reversable and acting to maintain the desired phase relationship between the sprocket 80 and the shaft 12 and thereby to maintain the desired amount of torque in the system. It will be seen that while the desired amount of torque is being maintained upon the transmissions 10 the only power required for conducting the test is that necessary to overcome the friction within these transmissions. Therefore it becomes unnecessary to provide the relatively large prime mover ordinarily required and also unnecessary to provide a means for absorbing power transmiting through the transmissions.

Figure 2:
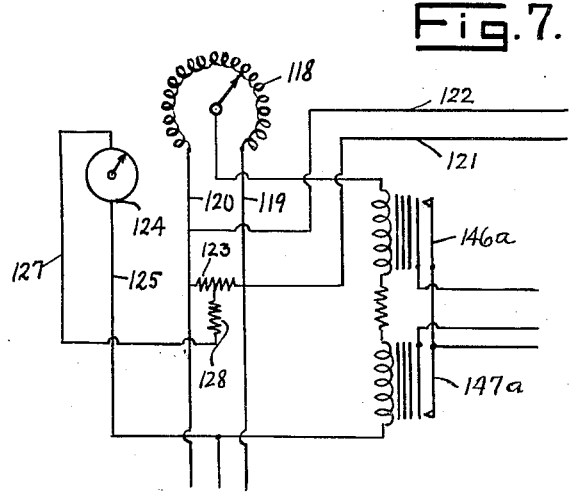

With reference to Fig. 2 there is here illustrated in simplified form the elements of the electrical control system in which the rectifiers and amplifiers are eliminated, a power input of direct current being secured from some suitable source and impressed through the conductors 121 and 122 onto the opposite ends of the potentiometers 37 and 118 through the conductors 119 and 120. Instead of employing the amplifiers 135 and 136 for the purpose of supplying the relays and controlling the brake and motor, the relays 146a and 147a which are opposed to each other and of a type adapted to close on flow of current therethrough in one direction only, are shown as being connected directly in the circuit between the movable contactor 126 of the potentiometer 37 and the movable contactor of the potentiometer 118. Such a system would undoubtedly be less sensitive than that illustrated in Fig. 1 and might be satisfactory only if used with amplifiers etc., similar to those illustrated in Fig. 1a, but is here shown for the purpose of illustrating in simpler form the elements of the electrical control system.

From the foregoing it will be appreciated that a means has been provided whereby all of the objects and advantages sought by this invention may be achieved.

Having described my invention, I claim:

1. In an apparatus for testing a mechanical power transmission mechanism under load, means for actuating said mechanism including a prime mover and power transmitting connections operatively connecting said prime mover simultaneously to both the input and output of said mechanism, means interposed in said power transmitting connections for changing the phase relationship of the parts of said power transmitting connections to induce a torque in the power transmission mechanism placing said transmission under a selected load, and electrical means responsive to the phase relationship between said parts for automatically controlling said phase changing means to maintain said torque at a predetermined value.

2. A phase shifting mechanism comprising two relatively rotatable elements, irreversible gear mechanism interconnecting said elements, rotatable with said elements, and adapted to control the phase relationship between them, means for actuating said gear mechanism while said gear mechanism and said elements are rotating together to change the phase relationship of said elements, torque responsive means carried by one of said elements to measure the torque induced by said mechanism, and control means actuated by said torque responsive means for controlling said gear actuating means to maintain a predetermined phase between said elements.

3. In combination with two concentric rotatable elements, means for changing and maintaining the phase relationship of said elements constituting irreversible gear mechanism interconnecting said elements and comprising a cage fixed concentrically on one of said elements, internal driven worm gear teeth on the interior of said cage, a body fixed concentrically on the other of said elements and disposed within said cage, a driving worm gear rotatably carried on said body on an axis transverse to the axis of said elements and having external driving teeth engaging the internal teeth in said cage, a driven worm wheel of less diameter than and fixedly mounted concentrically on said driving worm gear and having its toothed periphery in substantially the same plane as the axis of said elements, a driving worm shaft rotatably carried by said body concentrically with said elements and having a part projecting exteriorly of said body and elements and a part with worm driving teeth thereon in driving engagement with the teeth on said driven worm gear; torque responsive means carried by one of said elements and sensitive to the phase relationship of the elements; and control means actuated by said torque responsive means for controlling said gear actuating means to maintain a predetermined phase relationship between said elements.

4. In combination with two concentric rotatable elements, means for changing and maintaining the phase relationship of said elements constituting irreversible gear mechanism interconnecting said elements and comprising a cage fixed concentrically on one of said elements, internal driven worm gear teeth on the interior of said cage, a body fixed concentrically on the other of said elements and disposed within said cage, a driving worm gear rotatably carried on said body on an axis transverse to the axis of said elements and having external driving teeth engaging the internal teeth in said cage, means concentric with said elements and having parts projecting exteriorly of said body and elements for rotating said driving worm gear upon its axis; torque responsive means carried by one of said elements and sensitive to the phase relationship of the elements; and control means actuated by said torque responsive means for controlling said gear actuating means to maintain a predetermined phase relationship between said elements.

5. In an apparatus for testing a torque transmission mechanism under load, means for rotating said mechanism including a prime mover and power transmitting connections operatively connecting said prime mover simultaneously to both the input and output of said mechanism, means interposed in said power transmitting connections for changing the phase relationship of the parts of said power transmitting connections to induce a torque in said mechanism, and means for automatically maintaining said torque at a predetermined value, said latter means comprising a torque responsive device interposed in the power transmitting connections, an electrical torque detector sensitive to the torque responsive device, and electrical means controlled by said torque detector for operating said phase changing means when the torque indicated by said detector varies from the desired predetermined value.

6. A phase shifting mechanism comprising two relatively rotatable elements, irreversible gear mechanism interconnecting said elements, rotatable with said elements, and adapted to control the phase relationship between them, means for actuating said gear mechanism while said gear mechanism and said elements are rotating together to change the phase relationship of said elements, torque responsive means carried by one of said elements and adapted to be interconnected to the other whereby a torque may be induced therein by shifting the phase relationship of the elements, and electrical means responsive to the torque responsive means to control the actuating means for shifting the phase relationship of the elements.

7. A phase shifting mechanism comprising two relatively rotatable elements; irreversible gear mechanism interconnecting said elements, rotatable with said elements, and adapted to control the phase relationship between them; means for actuating said gear mechanism while said gear mechanism and said elements are rotating together to change the phase relationship of said elements; torque responsive means carried by one of said elements and adapted to be interconnected to the other whereby a torque may be induced therein by shifting the phase relationship of the elements, said torque responsive means including a potentiometer variable as a function of the induced torque, means for impressing a predetermined electromotive force on said potentiometer, and means for transposing the induced torque into a visible indication of current whereby said indication is a measure of said torque; and electrical means responsive to the torque responsive means and having operative connection with the actuating means to control the actuating means for shifting the phase relationship of the elements to maintain the torque indicating means at a selected value.

8. A phase shifting mechanism comprising two relatively rotatable elements; irreversible gear mechanism interconnecting said elements, rotatable with said elements, and adapted to control the phase relationship between them; means for actuating said gear mechanism while said gear mechanism and said elements are rotating together to change the phase relationship of said elements; torque responsive means including an elastic shaft section the opposite ends of which may be relatively displaced angularly in response to the phase relationship of said elements, said shaft rigidly connected to one of said elements only; said gear mechanism and said means for actuating the same including an idler cage rotatably surrounding one end of said elastic shaft section and rigidly connected to the rotatable element which is not rigidly fastened to the elastic shaft, said last element adapted to be interconnected with the end of the shaft remote from its rigid connection with the other element whereby angular displacement of the two ends of the shaft is responsive to the phase relationship of the elements; and electrical means responsive to the torque responsive means, said electrical means controlling said means for shifting the phase of the rotatable elements to maintain a selected torque on the torque responsive means.

9. A phase shifting mechanism comprising two relatively rotatable elements, irreversible gear mechanism interconnecting said elements, rotatable with said elements, and adapted to control the phase relationship between them, means concentric with said elements and rotatable with said elements and with respect to said elements, said last means being connected to said gear mechanism to actuate the same when said last means is rotated with respect to said elements, brake means for retarding rotation of said last means to cause it to rotate relative to said elements in one direction, motor means connected to said last means for rotating it faster than said elements to produce rotation of said last means with respect to said elements in the other direction, and automatically operable control means responsive to the torque induced in one of the elements by the gear mechanism and having operative connection with the brake means and said motor means to control the actuation thereof in accordance with said induced torque.

10. A phase shifting mechanism comprising two relatively rotatable elements, irreversible gear mechanism interconnecting said elements, rotatable with said elements, and adapted to control the phase relationship between them, means concentric with said elements and rotatable with said elements and with respect to said elements, said last means being connected to said gear mechanism to actuate the same when said last means is rotated with respect to said elements, brake means for retarding rotation of said last means to cause it to rotate relative to said elements in one direction, motor means connected to said last means for rotating it faster than said elements to produce rotation of said last means with respect to said elements in the other direction, said motor means being reversible whereby it may rotate said last means faster than said elements regardless of the direction of rotation of said elements, and automatically operable control means responsive to the torque induced in one of the elements by the gear mechanism and having operative connection with the brake means and said motor means to control the actuation thereof in accordance with said induced torque.

ELVIN G. BOICE.

REFERENCES CITED

The following references are of record in the file of this patent:

UNITED STATES PATENTS

| Number | Name | Date |
| --- | --- | --- |
| 1,916,118 | Robinson et al. | June 27, 1933 |
| 2,030,028 | Greenwood | Feb. 4, 1936 |
| 2,241,637 | Ernst et al. | May 13, 1941 |
| 2,245,075 | Mingle | June 10, 1941 |

FOREIGN PATENTS

| Number | Country | Date |
| --- | --- | --- |
| 87,995 | Switzerland | Feb. 1, 1921 |
| 697,586 | Germany | Oct. 17, 1940 |